(12) United States Patent
Huang et al.

(10) Patent No.: US 10,488,974 B2
(45) Date of Patent: Nov. 26, 2019

(54) TOUCH DISPLAY PANEL AND METHOD FOR DRIVING TOUCH DISPLAY PANEL

(71) Applicant: Wuhan China Star Optoelectronics Technology Co., Ltd., Wuhan, Hubei (CN)

(72) Inventors: Yao-li Huang, Guangdong (CN); Xinglong He, Guangdong (CN)

(73) Assignee: WUHAN CHINA STAR OPTOELECTRONICS TECHNOLOGY CO., LTD., Wuhan (CN)

(*) Notice: Subject to any disclaimer, the term of this patent is extended or adjusted under 35 U.S.C. 154(b) by 147 days.

(21) Appl. No.: 15/740,522

(22) PCT Filed: Nov. 17, 2017

(86) PCT No.: PCT/CN2017/111549
§ 371 (c)(1),
(2) Date: Dec. 28, 2017

(87) PCT Pub. No.: WO2019/061742
PCT Pub. Date: Apr. 4, 2019

(65) Prior Publication Data
US 2019/0095028 A1 Mar. 28, 2019

(30) Foreign Application Priority Data

Sep. 27, 2017 (CN) .......................... 2017 1 0890772

(51) Int. Cl.
*G06F 3/041* (2006.01)
*G06F 3/044* (2006.01)

(52) U.S. Cl.
CPC ............ *G06F 3/0416* (2013.01); *G06F 3/041* (2013.01); *G06F 3/044* (2013.01); *G06F 3/0412* (2013.01)

(58) Field of Classification Search
CPC .......... G06F 3/0416; G06F 3/044; G06F 3/41; G06F 3/0412
See application file for complete search history.

(56) References Cited

U.S. PATENT DOCUMENTS

2010/0328249 A1* 12/2010 Ningrat ................... G06F 3/044
345/174
2011/0310035 A1* 12/2011 Kim ....................... G06F 3/0412
345/173

(Continued)

FOREIGN PATENT DOCUMENTS

CN       104035249 A      9/2014
CN       104777955 A      7/2015

(Continued)

*Primary Examiner* — Temesghen Ghebretinsae
*Assistant Examiner* — Sosina Abebe
(74) *Attorney, Agent, or Firm* — Hemisphere Law, PLLC; Zhiagang Ma

(57) ABSTRACT

An embodiment of the present application discloses a touch display panel and a method for driving the touch display panel. Wherein, the touch display panel includes a plurality of first conductive lines, a plurality of second conductive lines, and pixel units located at intersections of the first conductive lines and the second conductive lines. The pixel units are electrically connected to the first conductive lines and the second conductive lines; a first switch and a second switch respectively disposed at two ends of the first conductive lines along the first direction, a third switch and a fourth switch respectively disposed at two ends of the second conductive lines along the second direction, the first direction perpendicular to the second direction, the touch display panel in a display state or a touch sensing state with a time division manner. The application can achieve the multiplexing of the display and the touch.

8 Claims, 4 Drawing Sheets

(56) References Cited

U.S. PATENT DOCUMENTS

| | | | |
|---|---|---|---|
| 2012/0075240 A1* | 3/2012 | Kida | G06F 3/044 |
| | | | 345/174 |
| 2012/0154327 A1* | 6/2012 | Liu | G06F 3/0412 |
| | | | 345/174 |
| 2012/0169400 A1* | 7/2012 | Liu | G06F 3/0416 |
| | | | 327/517 |
| 2017/0010737 A1* | 1/2017 | Liu | G06F 3/0416 |
| 2017/0068360 A1* | 3/2017 | Yuan | G06F 3/047 |

FOREIGN PATENT DOCUMENTS

| | | |
|---|---|---|
| CN | 105117087 A | 12/2015 |
| CN | 106125987 A | 11/2016 |
| CN | 106775126 A | 5/2017 |
| CN | 107086242 A | 8/2017 |
| CN | 107122081 A | 9/2017 |

\* cited by examiner

In the first time period p1, controlling the first switch 11 disposed on the first conductive line 10 included in the touch display panel 1000 and the third switch 21 disposed on the second conductive line 20 included in the touch display panel 1000 to be turned off, the second switch 12 disposed on the first conductive line 10 included in the touch display panel 1000 and the fourth switch 22 disposed on the second conductive line 20 included in the touch display panel 1000 to be turned on, to make the scanning driving signals to be applied to the first conductive line 10, and the image display signals are transmitted to the pixel unit 30 located at the intersection of the first conductive line 10 and the second conductive line 20 through the second conductive line 20, the display panel 1000 performs image display. — S401

In the second time period p2, the first conductive line 10 and the second conductive line 20 form a touch sensing capacitor, to control the first switch 11 and the third switch 21 to be turned on, the second switch 12 and the fourth switch 22 to be turned off, so that the touch driving signals are applied to the first conductive line 10, and the touch sensing signals output from the second conductive line 20. The touch display panel 1000 performs touch sensing. — S402

FIG. 4

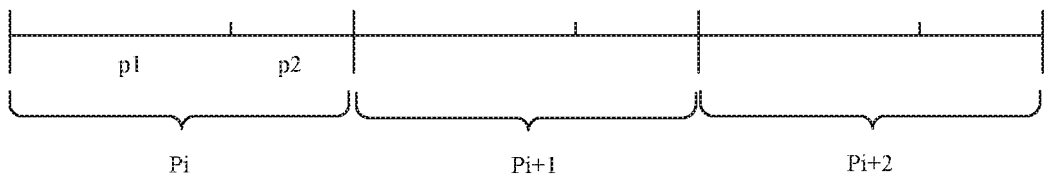

FIG. 5

TOUCH DISPLAY PANEL AND METHOD FOR DRIVING TOUCH DISPLAY PANEL

RELATED APPLICATIONS

The present application is a National Phase of International Application Number PCT/CN2017/111549, filed Nov. 17, 2017, and claims the priority of China Application CN201710890772.0, filed Sep. 27, 2017.

FIELD OF THE DISCLOSURE

The disclosure relates to a computer technology field, and more particularly to a touch display panel and a method for driving the touch display panel.

BACKGROUND

At present, the touch panel is as an input medium, the display panel is as a display medium, to facilitate human-computer interaction. Generally, the touch panel and the display panel can be integrated into the touch display panel to form various types of electronic devices, such as a mobile phone, a tablet, a MP3/MP4.

In general, the touch panel and the display panel of the electronic device are respectively used for touch sensing and image display, and the manufacturing process is more, and the process difficulty is increased.

SUMMARY

A technical problem to be solved by the embodiments of the present application is to provide a touch display panel and a method for driving the touch display panel, to realize the multiplexing of the touch display panel by first conductive lines and second conductive lines included in the touch display panel, so that the touch display panel does not need to separately dispose the touch panel. In addition to reducing the manufacturing complexity and cost of the touch display panel, the need for thinning of the touch display panel is also met.

An embodiment of the present application provides a touch display panel, including: a plurality of first conductive lines extending in a first direction and insulated from each other, a plurality of second conductive lines extending in a second direction and insulated from each other, and pixel units located at intersections of the first conductive lines and the second conductive lines, the pixel units electrically connected to the first conductive lines and the second conductive lines; a first switch and a second switch respectively disposed at two ends of the first conductive lines along the first direction, a third switch and a fourth switch respectively disposed at two ends of the second conductive lines along the second direction, the first direction perpendicular to the second direction, the touch display panel in a display state or a touch sensing state with a time division manner;

When the touch display panel in a display state, the first switch and the third switch in an off state, the second switch and the fourth switch in an on state, the first conductive lines transmitting scanning driving signals to the pixel units, and the second conductive lines transmitting image display signals to the pixel units, making the pixel units to perform image display; and When the touch display panel in the touch sensing state, the first switch and the third switch in the on state, the second switch and the fourth switch in the off state, the first conductive lines and the second conductive lines forming touch sensing capacitors, and the first conductive lines receiving touch driving signals, the second conductive lines used for outputting touch sensing signals to recognize touch operations received by the touch display panel.

Wherein the touch display panel further includes a touch circuit and a display circuit, the touch circuit is electrically connected to the first conductive lines through the first switch and electrically connected to the second conductive lines through the third switch, the display circuit is electrically connected to the first conductive lines through the second switch and electrically connected to the second conductive lines through the fourth switch;

The first switch configured to selectively control whether the first conductive lines electrically connected to the touch circuit, the touch circuit configured to output the touch driving signals to the first conductive lines when being electrically connected to the first conductive lines;

The second switch configured to selectively control whether the first conductive lines electrically connected to the display circuit, the display circuit configured to output the scanning driving signals to the first conductive lines when being electrically connected to the first conductive lines;

The third switch configured to selectively control whether the second conductive lines electrically connected to the touch circuit, the touch circuit further configured to receive the touch sensing signals from the second conductive lines when being electrically connected to the second conductive lines; and The fourth switch configured to selectively control whether the second conductive lines electrically connected to the display circuit, the display circuit further configured to output the image display signals to the second conductive lines when being electrically connected to the second conductive lines.

Wherein in a first time period, the touch display panel is in the display state, the first switch is in the off state, the first conductive lines is electrically disconnected from the touch circuit, the second switch is in the on state, the first conductive lines is electrically connected to the display circuit, the first conductive lines receives the scanning driving signals output from the display circuit, and in a second time period, the touch display panel is in the touch sensing state, the first switch is in the on state, the first conductive lines is electrically connected to the touch circuit, the second switch is in the off state, the first conductive lines is disconnected from the display circuit, the first conductive lines receives the touch driving signals outputted from the touch circuit; and In the first time period, the third switch is in the off state, the second conductive lines is disconnected from the touch circuit, the fourth switch is in the on state, the second conductive lines receives the image display signals outputted from the display circuit, and in the second time period, the third switch is in the on state, the second conductive lines is electrically connected to the touch circuit, the fourth switch is in the off state, the second conductive lines is electrically connected to the touch circuit, the second conductive lines outputs the touch sensing signals to the touch circuit.

Wherein when the touch display panel is in the touch sensing state, n first conductive lines are defined as a group, the plurality of the first conductive lines extending in the first direction and insulated from each other include x groups, each of the first conductive lines in each group simultaneously receives the touch driving signals output from the touch circuit, m second conductive lines are defined as a group, the plurality of second conductive lines extending in the second direction and insulated from each other include y groups, each of the y groups of each second conductive lines simultaneously outputs the touch sensing signals to the touch circuit, n, x, m, y are positive integer greater than 1.

Wherein the touch circuit outputs the touch driving signals to the first conductive lines of each group with a time division manner, and simultaneously receives the touch sensing signals outputted by the second conductive lines of each group.

Wherein when the touch display panel is in the touch sensing state, the touch driving signals are in a negative potential state.

The present application further provides a method for driving a touch display panel, including: the touch display panel including a plurality of first conductive lines, a plurality of second conductive lines, a first switch and a second switch disposed at two ends of the first conductive lines, a third switch and a fourth switch disposed at the second conductive lines, a pixel unit located at an intersection of the first conductive lines and the second conductive lines, and including a plurality of continuous working periods, each working period including:

In a first time period, controlling the first switch and the third switch to be turned off, the second switch and the fourth switch to be turned on, to make scanning driving signals to be applied to the first conductive lines, image display signals transmitted to the pixel unit through the second conductive lines, the touch display panel performing image display; and In a second time period, the first conductive lines and the second conductive lines forming a touch sensing capacitor to control the first switch and the third switch to be turned on, the second switch and the fourth switch to be turned off, making touch driving signals applied to the first conductive lines, and touch sensing signals outputted from the second conductive lines, the touch display panel performing touch sensing, wherein the first time period and the second time period are continuous and do not intersect to each other.

Wherein the touch display panel further includes a touch circuit and a display circuit, the method further includes:

Controlling the first switch to be turned on or off to selectively control whether the first conductive lines electrically connected to the touch circuit, and the touch driving signals being applied to the first conductive lines by the touch circuit when the first conductive lines electrically connected to the touch circuit;

Controlling the second switch to be turned on or off to selectively control whether the first conductive lines electrically connected to the display circuit, and the scanning driving signals being applied to the first conductive lines by the display circuit when the first conductive lines electrically connected to the display circuit;

Controlling the third switch to be turned on or off to selectively control whether the second conductive lines electrically connected to the touch circuit, and the touch sensing signals being received by touch circuit outputted by the second conductive lines when the second conductive lines electrically connected to the touch circuit; and Controlling the fourth switch to be turned on or off to selectively control whether the second conductive lines electrically connected to the display circuit, and the image display signals being applied to the second conductive lines by the display circuit when the second conductive lines electrically connected to the display circuit.

Wherein the method further includes:

Defining n first conductive lines as a group, the plurality of the first conductive lines includes x groups, each of the first conductive lines in each group simultaneously receives the touch driving signals output from the touch circuit;

Defining m second conductive lines as a group, the plurality of second conductive lines includes y groups, each of the y groups of each second conductive lines simultaneously outputs the touch sensing signals to the touch circuit; and wherein n, x, m, y are positive integer greater than 1.

Wherein the touch circuit outputs the touch driving signals to the first conductive lines of each group with a time division manner and simultaneously receives the touch sensing signals output from the second conductive lines of each group.

In summary, by controlling the on-off states of the first switch and the second switch disposed on the first conductive lines, and by controlling the on-off states of the third switch and the fourth switch disposed on the second conductive lines, the scanning driving signal and the image display signal may be controlled to be applied to the first conductive lines and the second conductive lines respectively, or the touch driving signal and the touch sensing signal may be respectively applied to the first conductive lines and the second conductive lines, so as to achieve the multiplexing of the display and touch of the first conductive lines and the second conductive lines, so that the touch display panel does not need to separately dispose the touch panel, in addition to reducing the process complexity and cost of the touch display panel, the touch display panel also satisfies the requirements for thinning of the touch display panel demand.

BRIEF DESCRIPTION OF THE DRAWINGS

Accompanying drawings are for providing further understanding of embodiments of the disclosure. The drawings form a part of the disclosure and are for illustrating the principle of the embodiments of the disclosure along with the literal description. Apparently, the drawings in the description below are merely some embodiments of the disclosure, a person skilled in the art can obtain other drawings according to these drawings without creative efforts. In the Figures:

FIG. 4 is a schematic flowchart of the method for driving the touch display panel shown in FIG. 2; and FIG. 5 is an operation timing chart of the touch display panel shown in FIG. 2.

DETAILED DESCRIPTION OF PREFERRED EMBODIMENTS

The technical solutions in the embodiments of the present application are clearly and completely described below with reference to the accompanying drawings in the embodiments of the present application. Obviously, the described embodiments are only some embodiments of the present application, rather than all of the embodiments. All other embodiments obtained by persons of ordinary skill in the art based on the embodiments of the present application without creative efforts shall fall within the protection scope of the present application.

Figure 1:
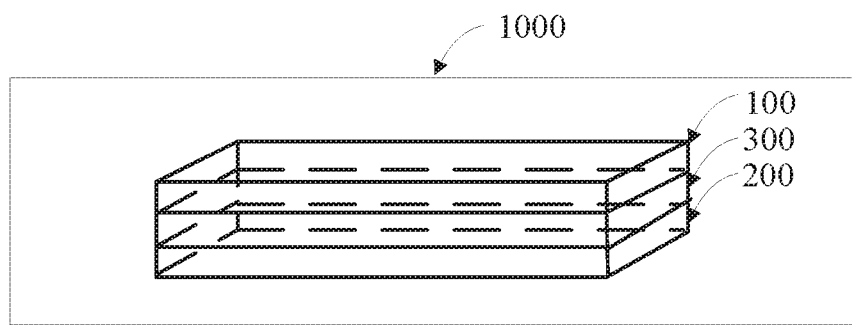
FIG. 1 is a schematic structural diagram of a touch display panel according to an embodiment of the present application.

Referring to FIG. 1, FIG. 1 is a schematic structural diagram of a touch display panel according to an embodiment of the present application. The touch display panel 1000 at least includes: an opposite substrate 100, an array substrate 200, and a dielectric layer 300 between the opposite substrate 100 and the array substrate 200. The dielectric layer 300 includes, but not limited to, a liquid crystal layer, such as an organic light emitting, OLED material. The liquid crystal layer is used as an example of the dielectric layer 300 for further description.

The array substrate 200 is provided with a plurality of scan lines (not shown) for providing scanning driving signals, and a plurality of data lines (not shown) for providing image display signals, and are intersected and insulated from each other, and display electrodes (not shown) are disposed at the intersections of the scan lines and the data lines, the display electrodes are disposed in the non-display area of the array substrate 200 and generate an electric field driven by a driving circuit to drive the liquid crystal molecules to rotate accordingly, to control the luminous flux for performing the image display. Wherein, a plurality of color filter layers with a plurality of colors may be disposed on the counter substrate 100 corresponding to the display electrodes, to enable the touch display panel 1000 to display color image. Wherein, the plurality of colors may be red, green and blue, RGB three primary colors.

The counter substrate 100 and the array substrate 200 may be disposed opposite to each other. Of course, it is also possible to provide a spacer between the opposite substrate 100 and the array substrate 200, the spacer may be used to maintain the separation distance between the opposite substrate 100 and the array substrate 200.

In the present embodiment, the touch display panel 1000 not only performs image display but also detects the touch operation applied to the touch display panel 1000 by using the capacitor structure formed by the scan lines and the data lines simultaneously. Wherein, the touch display panel 1000 is in a display state or a touch sensing state by time-division in a working period. Specifically, during a first time period, the touch display panel 1000 is in the display state, that is, the data lines and the scan lines on the array substrate 200 are used to transmit an image display signal to the display electrode to perform image display; during a second time period, the touch display panel 1000 is in the touch sensing state, that is, the data line and the scan line are stopped to provide the image display signal to the display electrode, one of the data line and the scan line is applied with the touch driving signal, and the other is used to output a touch sensing signal, in order to achieve touch operation detection.

In the embodiment of the present application, a working period refers to include at least one frame of image display and complete one touch sensing of the touch display panel 1000.

According to the embodiments of the present application, the touch sensing and image display can be performed by using the scan lines and the data lines included in the touch display panel in a time-division manner, thereby achieving the time-division multiplexing of the display and touch by the data lines and the scan lines, and reducing the process complexity and cost of the touch display panel, the touch display panel also satisfies the requirements for thinning of the touch display panel demand.

Figure 2:
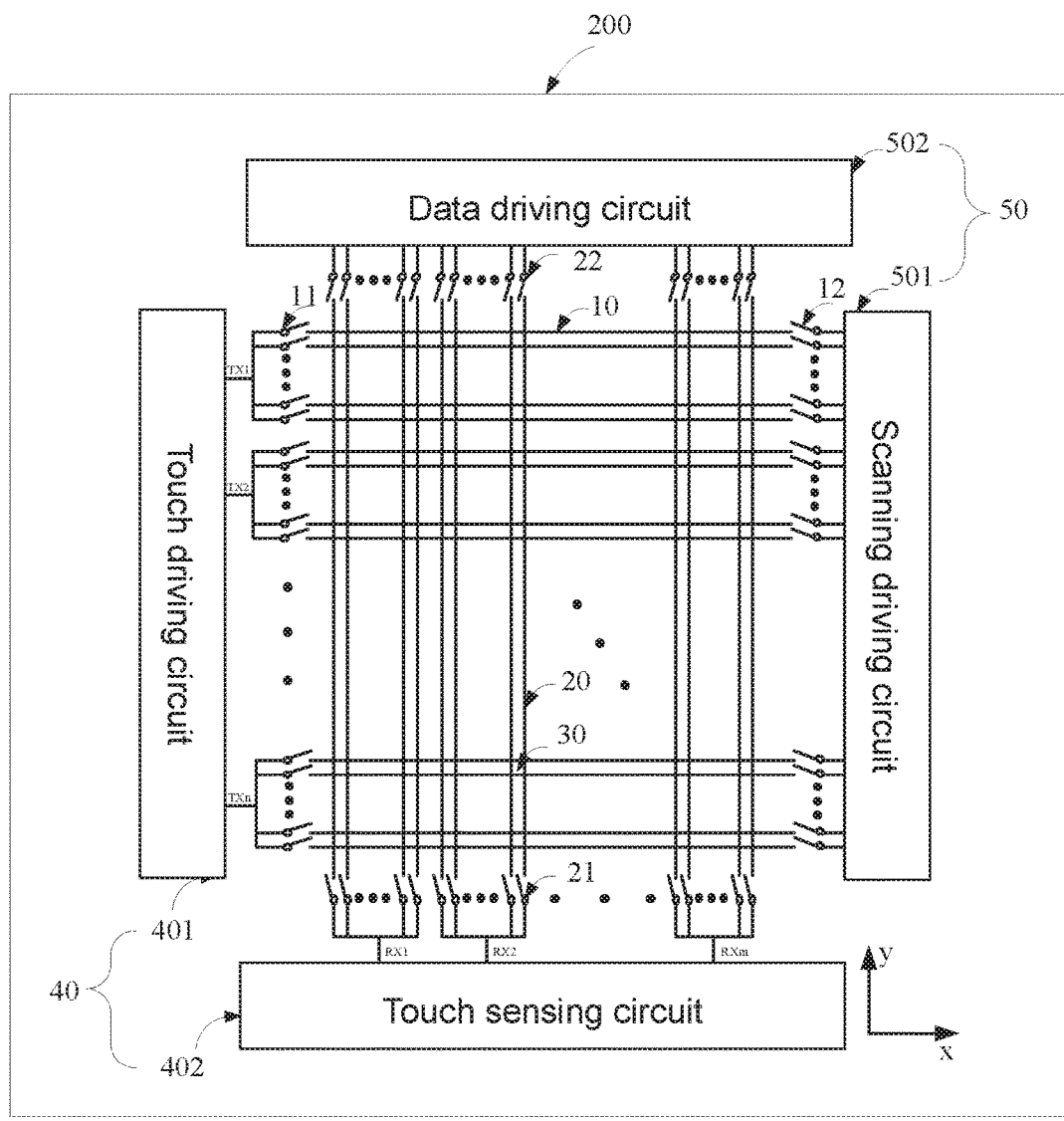
FIG. 2 is a schematic plan view of an array substrate in the touch display panel of FIG. 1.

Please refer to FIG. 2. FIG. 2 is a schematic plan view of an array substrate in the touch display panel of FIG. 1.

Combined referring to FIG. 1 and FIG. 2, the array substrate 200 includes a plurality of first conductive lines 10 extending in a first direction x, a plurality of second conductive lines 20 extending in a second direction y, a pixel unit 30 is located at an intersection of the first conductive lines 10 and the second conductive lines 20, and the first direction x and the second direction y are perpendicular to each other. Wherein, the pixel unit 30 is electrically connected to both of the first conductive lines 10 and the second conductive lines 20. The array substrate 200 further includes a touch circuit 40 and a display circuit 50. The touch circuit 40 is electrically connected to both of the first conductive lines 10 and the second conductive lines 20. The display circuit 50 is electrically connected to both of the first conductive lines 10 and the second conductive lines 20. In the present embodiment, the first conductive line 10 serves as a scan line for providing a scanning signal and the second conductive line 20 serves as a data line for providing an image signal.

When the touch display panel 1000 is in the touch sensing state, the touch circuit 40 applies the touch driving signal to the first conductive lines 10, and receives the touch sensing signal outputted from the second conductive lines 20, to recognize the touch operation received by the touch display panel 1000. When the touch display panel 1000 is in the display state, the display circuit 50 applies the scanning driving signal to the first conductive lines 10, and applies the image display signal to the second conductive lines 20, the first conductive lines 10 and the second conductive lines 20 transmit the scanning driving signal and the image display signal to the pixel unit 30, respectively, so that the pixel unit 30 performs image display.

Specifically, a first switch 11 and a second switch 12 are disposed at two ends of the first conductive lines 10 along the first direction x, respectively. A third switch 21 and a fourth switch 22 are disposed at two ends of the second conductive lines 20 along the second direction y, respectively.

The touch circuit 40 includes a touch display circuit 401 and a touch sensing circuit 402. The touch driving circuit 401 is electrically connected to the first conductive lines 10 through the first switch 11, the touch sensing circuit 402 is electrically connected to the second conductive lines 20 through the third switch 21. The display circuit 50 includes a scanning driving circuit 501 and a data driving circuit 502. The scanning driving circuit 501 is electrically connected to the first conductive lines 10 through the second switch 12. The data driving circuit 502 is electrically connected to the second conductive lines 20 through the fourth switch 22.

It should be noted that, by controlling the on-off states of the first switch 11 and the second switch 12, a signal applied to the first conductive lines 10 can be selectively controlled as a scanning driving signal or a touch driving signal. Wherein, the on-off states are an on state or an off state. Specifically, when the first switch 11 is in the on state, and the second switch 12 is in the off state, the touch driving circuit 401 applies the touch driving signal to the first conductive lines 10; when the first switch 11 is in the off state, and the second switch 12 is in the on state, the scanning driving circuit 501 applies the scanning driving signal to the first conductive lines 10. By controlling the on-off states of the third switch 21 and the fourth switch 22, the signal applied to the second conductive lines 20 can be selectively controlled as the image display signal or the touch sensing signal. Specifically, when the third switch 21 is in the on state, and the fourth switch 22 is in the off state, the touch sensing capacitor (not shown) formed at the intersection of the first conductive lines 10 and the second conductive lines 20 applied the touch sensing signal to the second conductive lines 20; when the third switch 21 is in the off state, and the fourth switch 22 is in the on state, the data driving circuit 502 applies the image display signal to the second conductive lines 20.

More specifically, when the touch display panel 1000 is in the display state, the first switch 11 and the third switch 21 are in off state, the second switch 12 and the fourth switch 22 are in on state, the scanning driving circuit 501 applies the scanning driving signal to the first conductive lines 10, the first conductive lines 10 transmits the scanning driving signal to the pixel unit 30 to turn on the pixel unit 30, after the image display signal applying to the second conductive lines 20 by the data driving circuit 502, the second conductive lines 20 transmits the image display signal to the pixel unit 30 to make the pixel unit 30 to perform the image display, so that the touch display panel 1000 performs image display. When the touch display panel 1000 is in the touch sensing state, the first switch 11 and the third switch 21 are in on state, the second switch 12 and the fourth switch 22 are in off state, the touch driving circuit 401 applies the touch driving signal to the first conductive lines 10, the first conductive lines 10 transmits the touch driving signal to the touch sensing capacitor formed at the intersection of the first conductive lines 10 and the second conductive lines 20, so that after the touch driving signal is converted into the touch sensing signal through the touch sensing capacitor, and then applied to the second conductive lines 20, making the second conductive lines 20 to output the touch sensing signal to the touch sensing circuit 402, to recognize the touch operation received by the touch display panel 1000. The touch operation includes but is not limited to a press operation, a slide operation and the other touch operations.

Figure 3:
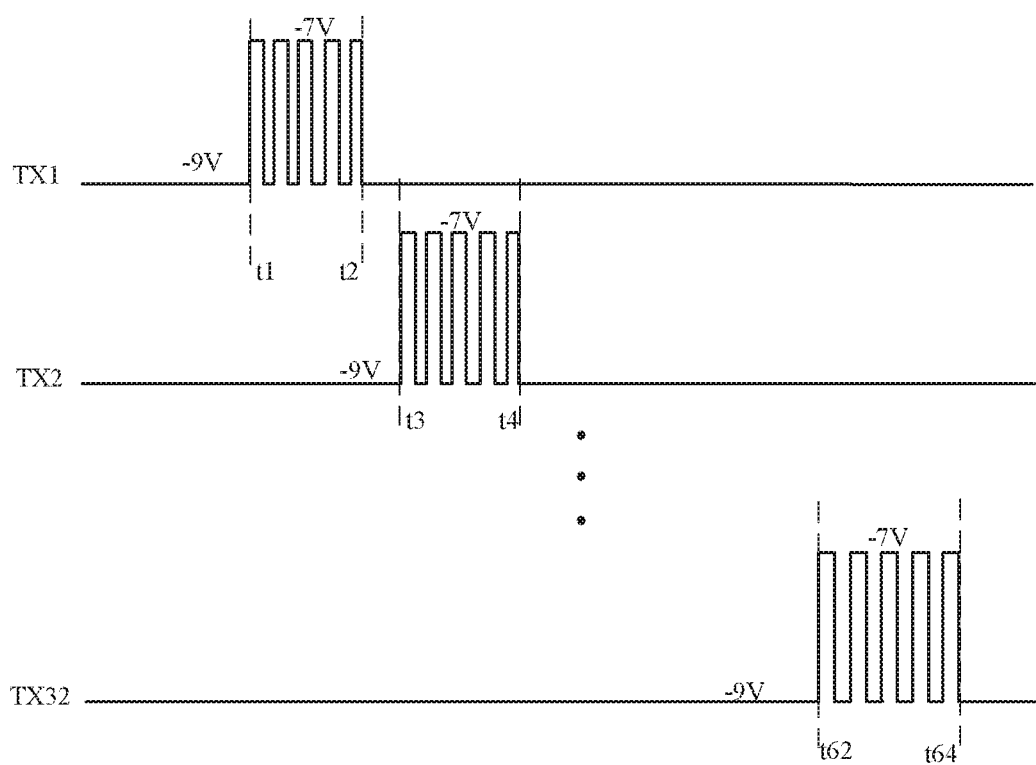
FIG. 3 is a waveform diagram of a touch driving signal according to an embodiment of the present application.

Preferably, if the first to fourth switches are N-type thin film transistors, when the touch display panel 1000 is in the touch sensing state, the touch driving signal is in a negative potential state, thereby preventing the pixel unit 30 from being turned on incorrectly to perform the image display. In this embodiment, the touch driving signal includes a plurality of pulse signals. As shown in FIG. 3, the touch sensing signal outputted from the touch driving circuit 401 to the first conductive lines 10 ($TX_1$-$TX_{32}$) of each group includes five −7V pulse signals.

Preferably, the plurality of first conductive lines 10 is defined as x groups, each group includes n first conductive lines 10, and each of the first conductive lines 10 transmits signals simultaneously. Correspondingly, the plurality of second conductive lines 20 is defined as y groups, each group of the second conductive lines 20 includes m second conductive lines 20, and each of the second conductive lines 20 in the y groups transmits signals simultaneously. Wherein, n, x, m, y are positive integers greater than one.

It should be noted that, the number of the plurality of first conductive lines 10 and the number of the plurality of second conductive lines 20 are determined according to the resolution of the touch display panel 1000. For example, if the resolution of the touch display panel 1000 is 1920*1080, the number of the plurality of first conductive lines 10 is 1920, and the number of the second conductive lines 20 is 3240.

The touch driving circuit 401 of the touch circuit 40 outputs the touch driving signal to all the first conductive lines 10 in each group, when the first switch 11 of each group of first conductive lines 10 is in the on state. The touch sensing circuit 402 of the touch circuit 40 receives the touch sensing signal output from the second conductive lines 20 of each group when the third switch 21 of each group of the second conductive lines 20 is in the on state.

For example, as shown in FIG. 2, if the number of the plurality of first conductive lines 10 is 1920, the 1920 first conductive lines 10 are defined as 32 groups, including $TX_1$-$TX_{32}$ groups. Each group includes 60 first conductive lines 10. Correspondingly, if the number of the plurality of second conductive lines is 3240, the 3240 second conductive lines 20 are defined as 18 groups, including $RX_1$-$RX_{18}$ groups. Each group includes 180 second conductive lines 20. The touch driving circuit 401 in the touch circuit 40 outputs the touch driving signal to the first conductive lines 10 of the corresponding group when the first switches 11 of each of the first conductive lines 10 in the 32 groups of the first conductive lines 10 is in the on state. The touch sensing circuit 402 in the touch circuit 40 receives the touch sensing signal output from each group of the second conductive lines 20 when the third switches 21 of each group of second conductive lines 20 in the 18 groups of the second conductive lines 20 is in the on state.

Specifically, when the touch display panel 1000 is in the touch sensing state, the touch driving circuit 401 of the touch circuit 40 outputs the touch driving signal to the first conductive lines 10 of each group with a time division manner, and the touch circuit 402 of the touch sensing circuit 40 receives the touch sensing signals output from the second conductive lines 20 of each group simultaneously.

For example, as shown in FIG. 2, if the number of the plurality of first conductive lines 10 is 1920, the 1920 first conductive lines 10 are defined as 32 groups, including $TX_1$-$TX_{32}$ groups. Each group includes 60 first conductive lines 10. As shown in FIG. 3, from t1 to t2, the touch driving circuit 401 outputs the touch driving signal to the first conductive lines 10 of the $TX_1$ group. From t3 to t4, the touch driving circuit 401 outputs the touch driving signal to the first conductive lines 10 of the $TX_2$ group. From t62 to t64, the touch driving circuit 401 outputs the touch driving signal to the first conductive lines 10 of the $TX_{32}$ group. Wherein, the touch driving signal includes five pulse signals. As shown in FIG. 2, if the number of the plurality of second conductive lines is 3240, the 3240 second conductive lines 20 are defined as 18 groups, including $RX_1$-$RX_{18}$ groups. Each group includes 180 second conductive lines 20. The touch sensing circuit 402 simultaneously receives the touch sensing signals output from the 18 groups of the second conductive lines 20.

According to the embodiment of the present application, by controlling the on-off states of the first switch and the second switch disposed on the first conductive lines, and by controlling the on-off states of the third switch and the fourth switch disposed on the second conductive lines, the scanning driving signal and the image display signal may be controlled to be applied to the first conductive lines and the second conductive lines respectively, or the touch driving signal and the touch sensing signal may be respectively applied to the first conductive lines and the second conductive lines, so as to achieve the multiplexing of the display and touch of the first conductive lines and the second conductive lines, so that the touch display panel does not need to separately dispose the touch panel, in addition to reducing the process complexity and cost of the touch display panel, the touch display panel also satisfies the requirements for thinning of the touch display panel demand.

Referring to FIGS. 4-5, FIG. 4 is a schematic flowchart of the method for driving the touch display panel shown in FIG. 2; FIG. 5 is an operation timing chart of the touch display panel shown in FIG. 2.

Wherein, the touch display panel 1000 includes a plurality of continuous working period P, such as Pi, Pi+1, Pi+2, . . . , wherein i is a natural number greater than or equal to 1. This embodiment uses the working period Pi as an example to describe in detail the working steps of the touch display panel 1000.

Specifically, in the working period Pi, includes a first time period p1 and a second time period p2, the touch display panel 1000 is in the display state in the first time period p1, and to control the touch display panel 1000 is in the touch sensing state in the second time period p2.

The driving method includes the following steps:

S401. In the first time period p1, controlling the first switch 11 disposed on the first conductive lines 10 included in the touch display panel 1000 and the third switch 21 disposed on the second conductive lines 20 included in the touch display panel 1000 to be turned off, the second switch 12 disposed on the first conductive lines 10 included in the touch display panel 1000 and the fourth switch 22 disposed on the second conductive lines 20 included in the touch display panel 1000 to be turned on, to make the scanning driving signal to be applied to the first conductive lines 10, and the image display signal is transmitted to the pixel unit 30 located at the intersection of the first conductive lines 10 and the second conductive lines 20 through the second conductive lines 20, the display panel 1000 performs image display.

It should be noted that, the touch display panel 1000 controls the touch display panel 1000 to perform image display or touch sensing by controlling the on-off states of each switch in the first conductive lines 10, and the on-off states of each switch in the second conductive lines 20. The on-off states can be understood as on or off. The first conductive lines 10 is a scan line, and the second conductive lines 20 is a data line.

Wherein, the touch display panel 1000 can selectively control the signal applied to the first conductive lines 10 to be a scanning driving signal or a touch driving signal by controlling the on-off states of the first switch 11 and the second switch 12. Correspondingly, by controlling the on-off states of the third switch 21 and the fourth switch 22, the signal applied to the second conductive lines 20 can be selectively controlled as the image display signal or the touch sensing signal.

Specifically, the touch display panel 1000 in the first time period p1, by controlling the first switch 11 and the third switch 21 to be turned on, and the second switch 12 and the fourth switch 22 to be turned on, so as to apply the scanning driving signal to the first conductive lines 10, and apply the image display signal applied to the second conductive lines 20, so that the touch display panel 1000 performs image display in the first time period p1. In addition, when the first conductive lines 10 transmits the scanning driving signal to the pixel unit to turn on the pixel unit 30, the pixel unit 30 receives the image display signal outputted from the second conductive lines 20, to make the pixel unit 30 performing image display according to the image display signal, so that the touch display panel 1000 can perform image display.

S402. In the second time period p2, the first conductive lines 10 and the second conductive lines 20 form a touch sensing capacitor, to control the first switch 11 and the third switch 21 to be turned on, the second switch 12 and the fourth switch 22 to be turned off, so that the touch driving signal is applied to the first conductive lines 10, and the touch sensing signal is output from the second conductive lines 20. The touch display panel 1000 performs touch sensing.

It should be noted that, the touch display panel 1000 in the second time period p2, by controlling the first switch 11 and the third switch 21 to be turned on, and the second switch 12 and the fourth switch 22 to be turned off, so as to apply the touch driving signal to the first conductive lines 10, and apply the touch sensing signal to the second conductive lines 20, so that the touch display panel 1000 performs touch sensing in the second time period. The touch sensing signal is output to the second conductive lines 20 by converting the touch driving signal output from the first conductive lines 10 through the touch sensing capacitor formed in the intersection of the first conductive lines 10 and the second conductive lines 20. The second time period p2 is after the first time period p1. The first time period p1 and the second time period p2 are continuous in time and do not intersect to each other.

Specifically, in the second time period p2, the touch circuit 40 outputs a touch driving signal to the first conductive lines 10 after the first switch 11 is turned on, the second conductive lines 20 outputs the touch sensing signal to the touch circuit 40, to recognize the touch operation received by the touch display panel 1000. The touch operation includes but is not limited to a press operation, a slide operation and the other touch operations.

More specifically, the touch circuit 40 may include the touch driving circuit 401 and the touch sensing circuit 402. In the second time period p2, the touch driving circuit 401 outputs the touch driving signal to the first conductive lines 10 after the first switch 11 is turned on, and the second conductive lines 20 outputs the touch sensing signal to the touch sensing circuit 402 to recognize the touch operation received by the touch display panel 1000.

Preferably, the plurality of first conductive lines 10 are defined as x groups, each group includes n first conductive lines 10, the touch driving circuit 401 in the touch circuit 40 outputs the touch driving signals to the first conductive lines 10 in groups with a time division manner. Correspondingly, the plurality of second conductive lines 20 are defined as y groups, each group includes m second conductive lines 20, the touch sensing circuit 402 in the touch circuit 40 simultaneously receives the touch sensing signals outputted from the second conductive lines 20 of the y-group. Wherein, n, x, m, y are positive integers greater than one. It should be noted that, the number of the plurality of first conductive lines 10 and the number of the second conductive lines 20 are determined according to the resolution of the touch display panel 1000. As shown in FIG. 2, if the resolution of the touch display panel is 1920*1080, the number of the plurality of first conductive lines 10 is 1920, the number of the plurality of second conductive lines 20 is 3240.

For example, as shown in FIG. 2, if the number of the plurality of first conductive lines 10 is 1920, the 1920 first conductive lines 10 are defined as 32 groups, including $TX_1$-$TX_{32}$ groups. Each group includes 60 first conductive lines 10. As shown in FIG. 3, from t1 to t2, the touch driving circuit 401 outputs the touch driving signal to the first conductive lines 10 of the $TX_1$ group. From t3 to t4, the touch driving circuit 401 outputs the touch driving signal to the first conductive lines 10 of the $TX_2$ group. From t62 to t64, the touch driving circuit 401 outputs the touch driving signal to the first conductive lines 10 of the $TX_{32}$ group. Wherein, the touch driving signal includes five pulse signals. As shown in FIG. 2, if the number of the plurality of second conductive lines is 3240, the 3240 second conductive lines

20 are defined as 18 groups, including $RX_1$-$RX_{18}$ groups. Each group includes 180 second conductive lines 20. The touch sensing circuit 402 simultaneously receives the touch sensing signals output from the 18 groups of the second conductive lines 20.

Preferably, when each of the switches is an N-type thin film transistor, the touch driving signal is in a negative potential state, thereby preventing the pixel unit 30 from being driven to perform image display. As shown in FIG. 3, the touch driving signal output from the touch driving circuit 401 to each group of the first conductive lines 10 ($TX_1$-$TX_{32}$) includes five −7V pulse signals.

According to the embodiment of the present application, by controlling the on-off states of the first switch and the second switch disposed on the first conductive lines with a time division manner, the touch driving signal and the touch sensing signal may be controlled to be respectively applied to the first conductive lines and the second conductive lines, or the signal to be respectively applied to the first conductive lines and the second conductive lines is the scanning driving signal and the image display signal, so as to achieve the multiplexing of the display and touch of the first conductive lines and the second conductive lines, so that the touch display panel does not need to separately dispose the touch panel, in addition to reducing the process complexity and cost of the touch display panel, the touch display panel also satisfies the requirements for thinning of the touch display panel demand.

The foregoing contents are detailed description of the disclosure in conjunction with specific preferred embodiments and concrete embodiments of the disclosure are not limited to these descriptions. For the person skilled in the art of the disclosure, without departing from the concept of the disclosure, simple deductions or substitutions can be made and should be included in the protection scope of the application.

What is claimed is:

1. A touch display panel, comprising:
    a plurality of first conductive lines extending in a first direction and insulated from each other, a plurality of second conductive lines extending in a second direction and insulated from each other, and pixel units located at intersections of the first conductive lines and the second conductive lines, the pixel units electrically connected to the first conductive lines and the second conductive lines;
    a first switch and a second switch respectively disposed at two ends of the first conductive lines along the first direction, a third switch and a fourth switch respectively disposed at two ends of the second conductive lines along the second direction, the first direction perpendicular to the second direction, the touch display panel in a display state or a touch sensing state with a time division manner;
    when the touch display panel in a display state, the first switch and the third switch in an off state, the second switch and the fourth switch in an on state, the first conductive lines transmitting scanning driving signals to the pixel units, and the second conductive lines transmitting image display signals to the pixel units, making the pixel units to perform image display; and
    when the touch display panel in the touch sensing state, the first switch and the third switch in the on state, the second switch and the fourth switch in the off state, the first conductive lines and the second conductive lines forming touch sensing capacitors, and the first conductive lines receiving touch driving signals, the second conductive lines used for outputting touch sensing signals to recognize touch operations received by the touch display panel;
    wherein the touch display panel further comprises a touch circuit and a display circuit, the touch circuit is electrically connected to the first conductive lines through the first switch and electrically connected to the second conductive lines through the third switch, the display circuit is electrically connected to the first conductive lines through the second switch and electrically connected to the second conductive lines through the fourth switch;
    the first switch configured to selectively control whether the first conductive lines electrically connected to the touch circuit, the touch circuit configured to output the touch driving signals to the first conductive lines when being electrically connected to the first conductive lines;
    the second switch configured to selectively control whether the first conductive lines electrically connected to the display circuit, the display circuit configured to output the scanning driving signals to the first conductive lines when being electrically connected to the first conductive lines;
    the third switch configured to selectively control whether the second conductive lines electrically connected to the touch circuit, the touch circuit further configured to receive the touch sensing signals from the second conductive lines when being electrically connected to the second conductive lines; and
    the fourth switch configured to selectively control whether the second conductive lines electrically connected to the display circuit, the display circuit further configured to output the image display signals to the second conductive lines when being electrically connected to the second conductive lines.

2. The touch display panel according to claim 1, wherein in a first time period, the touch display panel is in the display state, the first switch is in the off state, the first conductive lines is electrically disconnected from the touch circuit, the second switch is in the on state, the first conductive lines is electrically connected to the display circuit, the first conductive lines receives the scanning driving signals output from the display circuit, and in a second time period, the touch display panel is in the touch sensing state, the first switch is in the on state, the first conductive lines is electrically connected to the touch circuit, the second switch is in the off state, the first conductive lines is disconnected from the display circuit, the first conductive lines receives the touch driving signals outputted from the touch circuit; and
    in the first time period, the third switch is in the off state, the second conductive lines is disconnected from the touch circuit, the fourth switch is in the on state, the second conductive lines receives the image display signals outputted from the display circuit, and in the second time period, the third switch is in the on state, the second conductive lines is electrically connected to the touch circuit, the fourth switch is in the off state, the second conductive lines is electrically connected to the touch circuit, the second conductive lines outputs the touch sensing signals to the touch circuit.

3. The touch display panel according to claim 1, wherein when the touch display panel is in the touch sensing state, n first conductive lines are defined as a group, the plurality of the first conductive lines extending in the first direction and insulated from each other comprise x groups, each of the first conductive lines in each group simultaneously receives the touch driving signals output from the touch circuit, m second conductive lines are defined as a group, the plurality of second conductive lines extending in the second direction and insulated from each other comprise y groups, each of the y groups of each second conductive lines simultaneously outputs the touch sensing signals to the touch circuit, n, x, m, y are positive integer greater than 1.

4. The touch display panel according to claim 3, wherein the touch circuit outputs the touch driving signals to the first conductive lines of each group with a time division manner, and simultaneously receives the touch sensing signals outputted by the second conductive lines of each group.

5. The touch display panel according to claim 4, wherein when the touch display panel is in the touch sensing state, the touch driving signals are in a negative potential state.

6. A method for driving a touch display panel, comprising:
the touch display panel comprising a plurality of first conductive lines, a plurality of second conductive lines, a first switch and a second switch disposed at two ends of the first conductive lines, a third switch and a fourth switch disposed at the second conductive lines, a pixel unit located at an intersection of the first conductive lines and the second conductive lines, and comprising a plurality of continuous working periods, each working period comprising:
in a first time period, controlling the first switch and the third switch to be turned off, the second switch and the fourth switch to be turned on, to make scanning driving signals to be applied to the first conductive lines, image display signals transmitted to the pixel unit through the second conductive lines, the touch display panel performing image display; and
in a second time period, the first conductive lines and the second conductive lines forming a touch sensing capacitor to control the first switch and the third switch to be turned on, the second switch and the fourth switch to be turned off, making touch driving signals applied to the first conductive lines, and touch sensing signals outputted from the second conductive lines, the touch display panel performing touch sensing, wherein the first time period and the second time period are continuous and do not intersect to each other;
wherein the touch display panel further comprises a touch circuit and a display circuit, the method further comprises:
controlling the first switch to be turned on or off to selectively control whether the first conductive lines electrically connected to the touch circuit, and the touch driving signals being applied to the first conductive lines by the touch circuit when the first conductive lines electrically connected to the touch circuit;
controlling the second switch to be turned on or off to selectively control whether the first conductive lines electrically connected to the display circuit, and the scanning driving signals being applied to the first conductive lines by the display circuit when the first conductive lines electrically connected to the display circuit;
controlling the third switch to be turned on or off to selectively control whether the second conductive lines electrically connected to the touch circuit, and the touch sensing signals being received by touch circuit outputted by the second conductive lines when the second conductive lines electrically connected to the touch circuit; and
controlling the fourth switch to be turned on or off to selectively control whether the second conductive lines electrically connected to the display circuit, and the image display signals being applied to the second conductive lines by the display circuit when the second conductive lines electrically connected to the display circuit.

7. The method for driving the touch display panel according to claim 6, wherein the method further comprises:
defining n first conductive lines as a group, the plurality of the first conductive lines comprises x groups, each of the first conductive lines in each group simultaneously receives the touch driving signals output from the touch circuit;
defining m second conductive lines as a group, the plurality of second conductive lines comprises y groups, each of the y groups of each second conductive lines simultaneously outputs the touch sensing signals to the touch circuit; and
wherein n, x, m, y are positive integer greater than 1.

8. The method for driving the touch display panel according to claim 7, wherein the touch circuit outputs the touch driving signals to the first conductive lines of each group with a time division manner and simultaneously receives the touch sensing signals output from the second conductive lines of each group.

* * * * *